A. E. CHURCH.
CHUCK.
APPLICATION FILED JUNE 20, 1918.
1,314,126.
Patented Aug. 26, 1919.
2 SHEETS—SHEET 1.
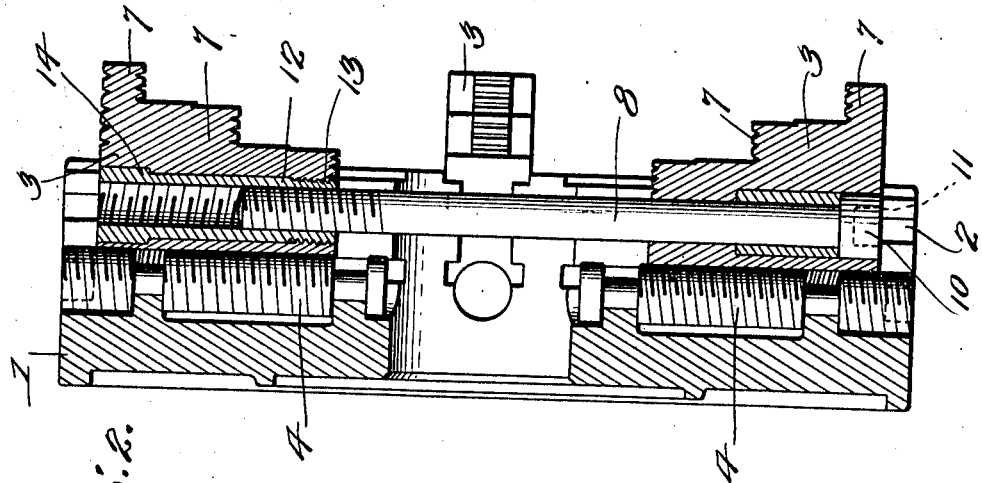
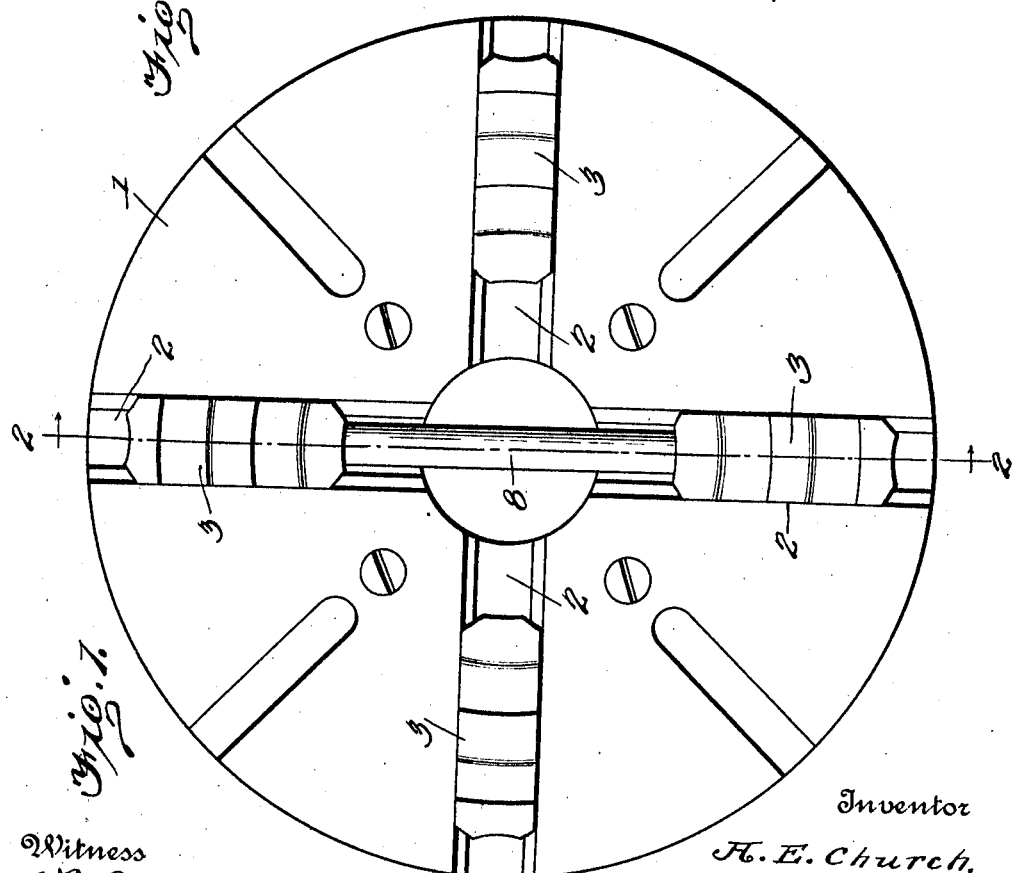
Witness
J. R. Pierce
Inventor
A. E. Church,
By H. B. Willson & Co.
Attorneys

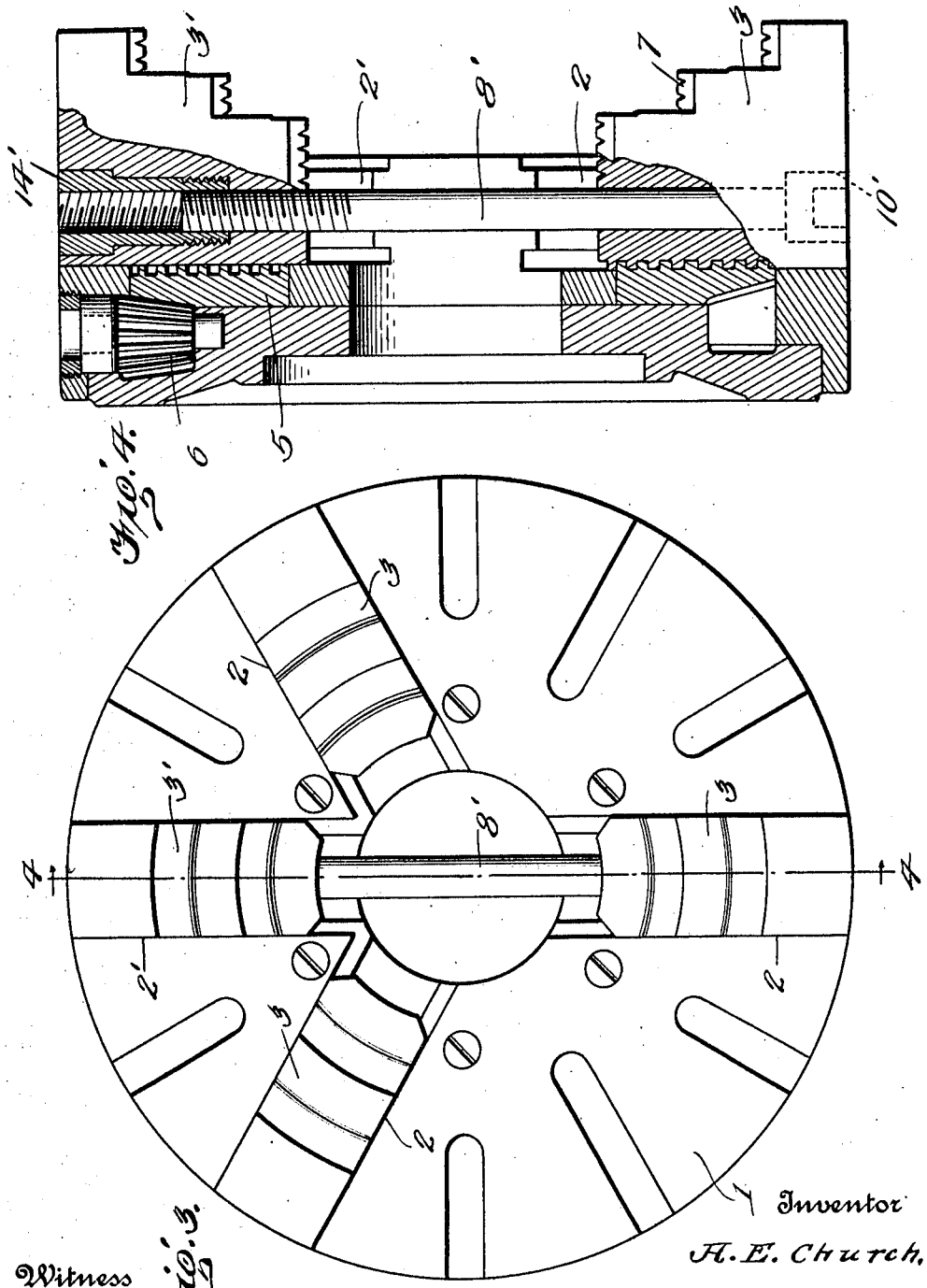

UNITED STATES PATENT OFFICE.

ALBERT E. CHURCH, OF NEW BRITAIN, CONNECTICUT.

CHUCK.

1,314,126.
Specification of Letters Patent. Patented Aug. 26, 1919.

Application filed June 20, 1918. Serial No. 241,013.

*To all whom it may concern:*

Be it known that I, ALBERT E. CHURCH, a citizen of the United States, residing at New Britain, in the county of Hartford and State of Connecticut, have invented certain new and useful Improvements in Chucks; and I do declare the following to be a full, clear, and exact description of the invention, such as will enable others skilled in the art to which it appertains to make and use the same.

My invention relates to improvements in chucks such as those used primarily on lathes. Heretofore, considerable difficulty has been encountered in holding the work against turning in the chuck jaws without excessively tightening the jaw operating means. This not only places great strain on these operating means, often causing breakage thereof, but in time the chuck head is warped and the jaws allowed to cant, producing what is known as a bell mouth chuck. A chuck in this condition is practically worthless and my invention therefore aims to prevent such occurrences by the provision of supplemental jaw operating means located between the work grips and the usual operating means, thus allowing a suitable number of the jaws to be engaged unusually tight with the work to prevent slippage of the latter, without excessive tightening of the usual operating means and subjecting the latter to injury.

With the foregoing object in view, the invention resides in the construction and arrangement of parts as hereinafter fully described and claimed, the descriptive matter being supplemented by the accompanying drawings, which form a part of this application and in which:

Figure 1 is a front elevation of a four-jaw chuck constructed in accordance with my invention;

Fig. 2 is a sectional view on the plane indicated by the line 2—2 of Fig. 1;

Fig. 3 is a front elevation of a three-jaw chuck embodying the present improvements; and Fig. 4 is a sectional view on the plane of the line 4—4 of Fig. 3.

In the drawings above briefly described, the numeral 1 designates a common type of chuck head having radial jaw guides 2 in which the usual jaws 3 are slidably mounted. As well known, these jaws vary in number, but for illustrative purposes, I have shown a four-jaw chuck in Figs. 1 and 2 and a three-jaw chuck in Figs. 3 and 4, the improvements being necessarily different on chucks embodying an even and an odd number of jaws. The usual operating means for the jaws 3 is provided, said means consisting of radial screws 4 such as seen in Fig. 2, of a scroll 5 driven by pinions 6 as illustrated in Fig. 4, or being of any other adequate design. In all cases however the operating means in question are located at the inner ends of the jaws, while the outer ends of the latter are provided with the usual work grips 7.

In Figs. 1 and 2, the auxiliary jaw operating means consists of a diametrically disposed screw 8 having on one end a head 10 which is swiveled in one of the jaws 3 and preferably bears against a thrust sleeve inset in the latter, said head being provided with a socket 11 or other preferred means to receive the same key or the like which is used to adjust the screws 4. The end of screw 8 remote from head 10, is threaded into a removable hard metal nut 12, said nut being in turn threaded in one of the jaws 3 at 13 and provided with a head 14 resting solidly against an internal shoulder thereof. By this arrangement, after tightening the screws 4 and drawing the work grips 7 tightly against the work, the screw 8 is tightened. This draws the outer ends of two of the opposed jaws sufficiently tight against the work to prevent turning of the latter in the jaws, yet it will be seen that excessive strain is relieved from the screws 4 or other adjusting means which may be provided, thus eliminating the danger of breaking such adjusting means or of canting the jaws in the manner above set forth.

In applying the present improvements to a chuck employing an uneven number of jaws such as shown in Figs. 3 and 4, a supplemental jaw guide 2' is formed in the head 1 diametrically opposite one of the guides 2, and an auxiliary floating jaw 3' is mounted in said guide 2'. The adjusting screw 8' is engaged with the jaw 3' and the jaw 3 diametrically opposite the same and when tightened, produces the same advantages as those above pointed out. A removable hardened metal nut 14' similar to the nut 14, is preferably provided in the jaw 3' to receive the screw 8', and the head 10' of said screw may be swiveled in any preferred manner.

In both forms of the invention, it is to be observed that the auxiliary jaw adjusting means, that is the diametrical screw, is located between the work grips 7 of the several jaws and the main operating means of said jaws. This arrangement is highly important, since otherwise the spreading of the jaws and the formation of a bell mouth chuck cannot be prevented. Since probably the best results are obtained from the several details shown and described, they are by preference followed, but I wish it understood that within the scope of the invention as claimed, considerable latitude is allowed.

I do not claim that my invention is sufficiently broad to include a chuck in which jaw carriers are adjusted radially and provided with jaws which are independently adjustable upon said carriers, since this form of chuck is well known, as evidenced for instance by United States Patent 295,230, of March 18, 1884. In this type of chuck, the independent adjusting means for the jaws reacts upon the main adjusting means of the jaw carriers and therefore does not decrease the strain upon said main adjusting means. In the present invention, the auxiliary adjusting means reacts at a point totally independent of the main adjusting means, and in the embodiment shown, said auxiliary adjusting means acts on opposed jaws and reacts upon one of these jaws. It will thus be clear that operation of the auxiliary adjusting means will relieve the main adjusting means of strain.

I claim:

1. A chuck comprising a head, radially movable jaws carried by said head and having work grips at their outer ends, means at the inner ends of said jaws for adjusting the same to grip the work, and auxiliary adjusting means for said jaws located between said first named jaw adjusting means and said work grips and having a point of reaction independent of said first named jaw operating means.

2. A structure as specified in claim 1, said auxiliary adjusting means consisting of a diametrical jaw engaging screw.

3. A chuck comprising a head, jaws radially slidable on said head and having work grips at their outer ends, two of said jaws being opposed diametrically, main jaw operating means at the inner ends of said jaws, and an auxiliary diametrical jaw operating screw engaged with said diametrically opposed jaws between said work grips and said main operating means to tightly grip the work between said jaws without placing excessive strain on said main jaw operating means.

4. In a chuck, a head, jaws mounted on said head and having work gripping means at their outer ends, main jaw operating means at the inner ends of said jaws, and auxiliary jaw operating means connecting opposed jaws between said work gripping means and said main jaw operating means for exerting an inward thrust on said opposed jaws to relieve said main jaw operating means of strain.

5. A chuck comprising a head, an uneven number of jaws radially slidable on said head, the outer ends of said jaws having work grips, operating means for said jaws, an auxiliary floating jaw radially slidable diametrically opposite one of said first named jaws and having work gripping means at its outer end, and an auxiliary diametrical operating screw engaged with said floating jaw and with the opposite jaw to draw them tightly against the work without placing excessive strain on said jaw operating means.

6. A chuck comprising a head, radially movable jaws carried by said head and having work grips at their outer ends, means at the inner ends of said jaws for adjusting the same to grip the work, and auxiliary adjusting means for said jaws located between said first named jaw adjusting means and said work grips, said auxiliary adjusting means acting on opposed jaws and having a point of reaction on one of said jaws.

In testimony whereof I have hereunto set my hand.

ALBERT E. CHURCH.

Copies of this patent may be obtained for five cents each, by addressing the "Commissioner of Patents, Washington, D. C."